No. 727,752. PATENTED MAY 12, 1903.
C. CROMPTON.
STEAM ENGINE.
APPLICATION FILED SEPT. 25, 1901.
NO MODEL. 3 SHEETS—SHEET 1.
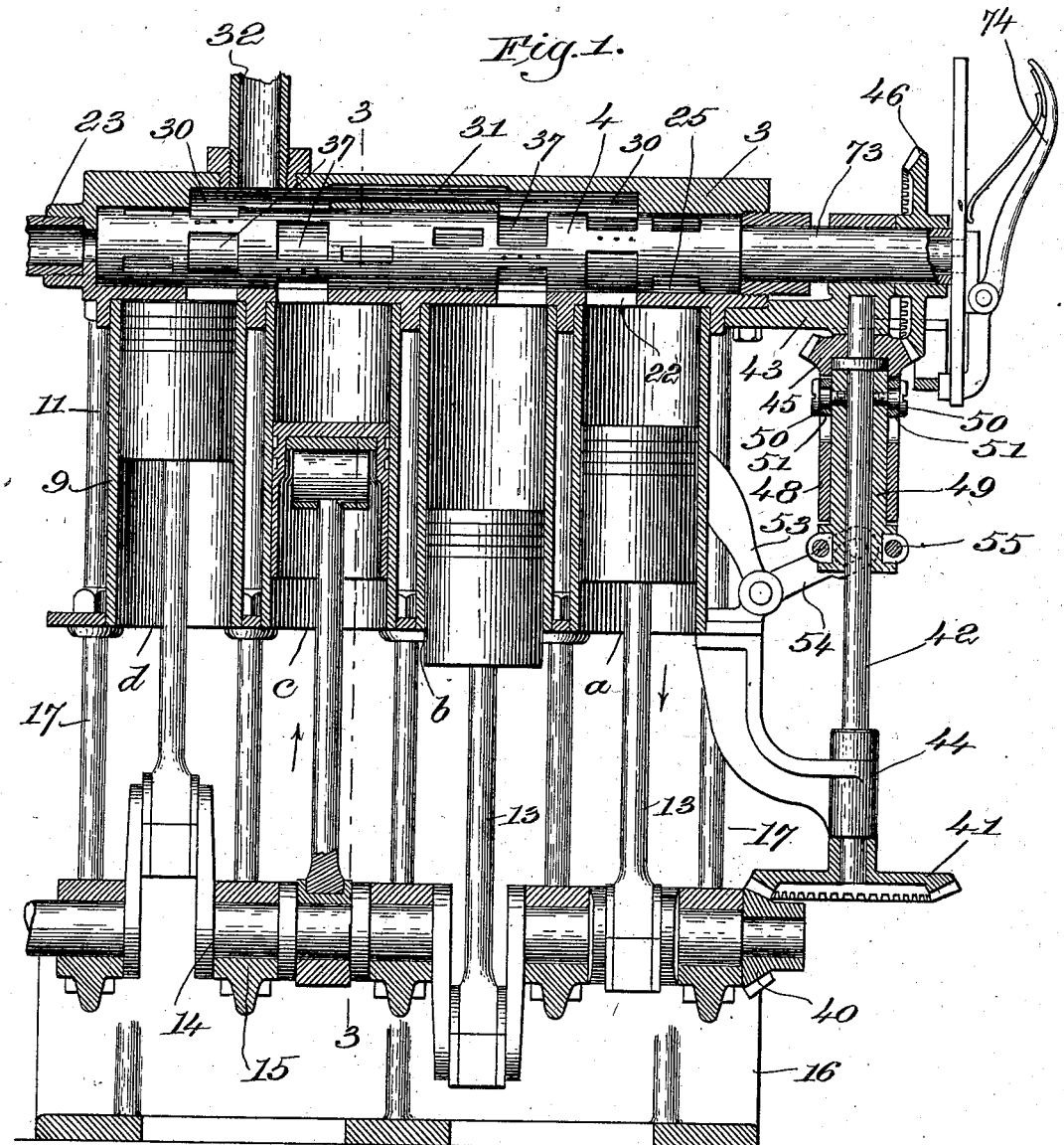
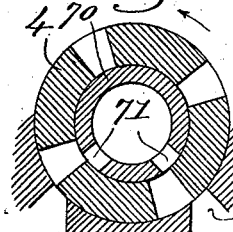
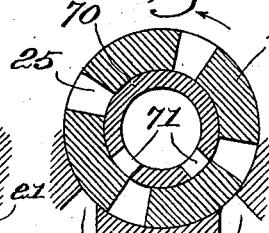
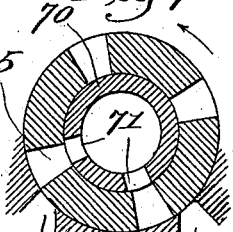
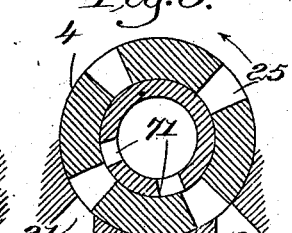
Witnesses.
Thomas J. Drummond.
Adolph␣␣␣Kaiser.
Inventor.
Charles Crompton,
by Crosby Gregory
Attys.

No. 727,752. PATENTED MAY 12, 1903.
C. CROMPTON.
STEAM ENGINE.
APPLICATION FILED SEPT. 25, 1901.
NO MODEL. 3 SHEETS—SHEET 2.
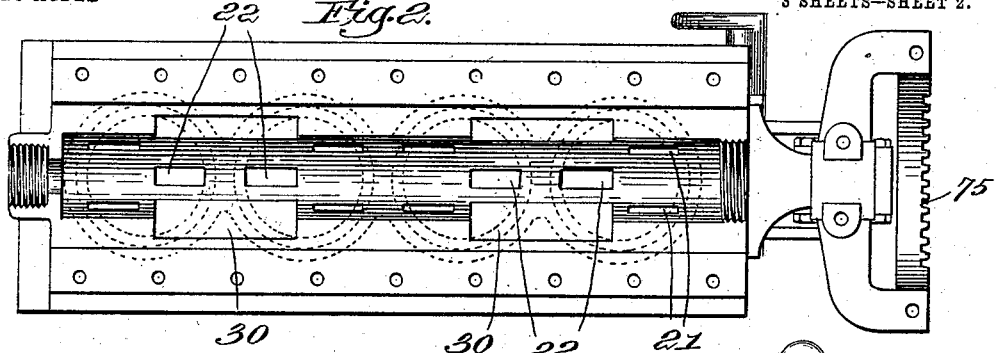
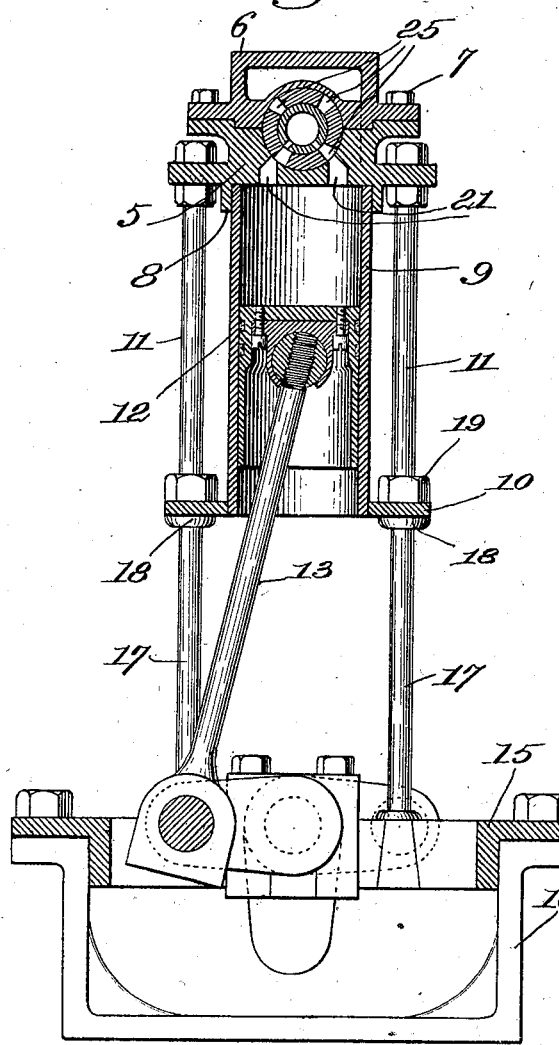
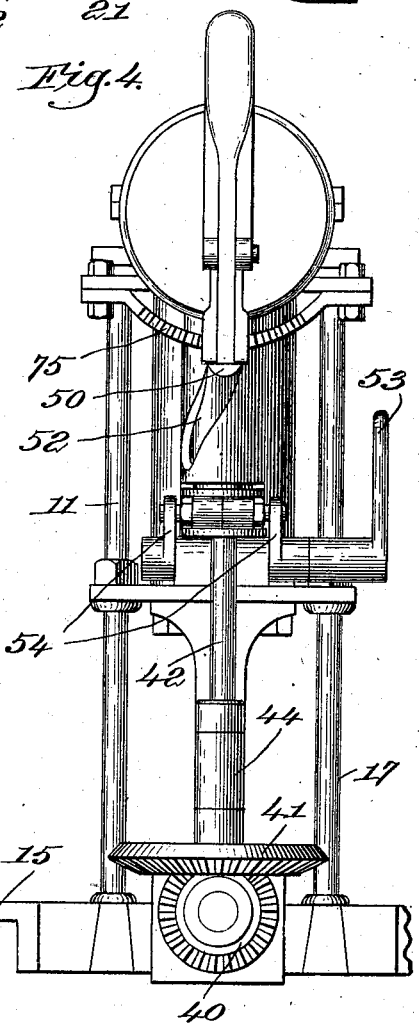
Witnesses.
Thomas J. Drummond
Adolph Kaiser
Inventor.
Charles Crompton,
by Dudley Gregory
Atty's No. 727,752. PATENTED MAY 12, 1903.
C. CROMPTON.
STEAM ENGINE.
APPLICATION FILED SEPT. 25, 1901.
NO MODEL. 3 SHEETS—SHEET 3.
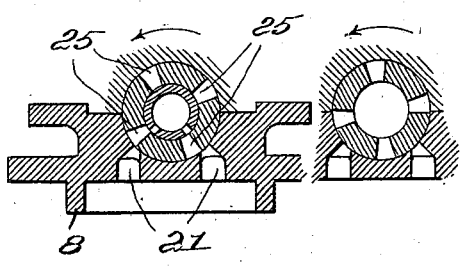

No. 727,752. Patented May 12, 1903.

UNITED STATES PATENT OFFICE.

CHARLES CROMPTON, OF WORCESTER, MASSACHUSETTS.

STEAM-ENGINE.

SPECIFICATION forming part of Letters Patent No. 727,752, dated May 12, 1903.

Application filed September 25, 1901. Serial No. 76,549. (No model.)

*To all whom it may concern:*

Be it known that I, CHARLES CROMPTON, a citizen of the United States, and a resident of Worcester, county of Worcester, State of Massachusetts, have invented an Improvement in Steam-Engines, of which the following description, in connection with the accompanying drawings, is a specification, like characters on the drawings representing like parts.

This invention relates to steam-engines; and it is the object of the invention to provide an engine of few parts and compact form which is capable of generating great power, thus especially adapting the engine for use in propelling motor vehicles or yachts.

With this object in view my invention comprises an engine having one or more single-acting cylinders combined with a rotary valve adapted to successively admit steam to the various cylinders and to exhaust it therefrom. The valve is preferably a hollow valve and steam is admitted to the interior thereof, from which it passes through suitable steam-ports to the inlet-ports of the various cylinders.

In connection with my rotary valve I have provided a novel form of cut-off valve which is concentric with the rotary valve and by its adjustment operates to vary the point of cut-off of the main rotary valve to any desired extent without in any way affecting the lead or exhaust closure. I have also provided in connection with the usual exhaust-ports in the valve supplementary openings, which remain open after the main exhaust is closed and which allow any water of condensation that may accumulate in the cylinder to be forced therethrough. With this construction the engine may be started at any time without the necessity of draining the cylinders, and as soon as the water of condensation is forced through said supplementary exhaust-openings pounding and hammering will cease.

In the drawings, Figure 1 is a vertical central section of my improved engine. Fig. 2 is a top plan view of the steam-chest with the upper cap removed, this view showing the admission and exhaust ports leading to and from the cylinders. Fig. 3 is a section on the line 3 3, Fig. 1. Fig. 4 is an end elevation of the engine. Figs. 5 to 8 are detail views showing the operation of my improved cut-off valve; and Figs. 9 to 24, inclusive, are views showing different positions of the rotary valve.

Referring to Fig. 1, 3 indicates the steam-chest of the engine, it having a cylindrical bore in which the rotary valve 4, hereinafter described, is mounted for rotation. The steam-chest 3 preferably comprises the base portion 5 and the cap portion 6, the said cap portion being secured to the base portion in any suitable way, as by bolts 7, Fig. 3. The lower side of the base portion 5 is provided with a series of recesses formed by the depending flanges 8, there being four such recesses in this embodiment of my invention, and in said recesses is supported one end of the cylinders 9. (Seen in Figs. 1 and 3.) The opposite end of each of the cylinders 9 is inserted in an aperture in a supporting-plate 10, the said apertures being of a size to tightly fit the cylinders, and the said supporting-plate 10 is rigidly held in position by means of any suitable tie members 11, which connect the same to the base portion 5 of the steam-chest. The pistons 12, which play in the cylinders and which may be of any suitable construction, have pivoted thereto in any usual way the pitman-rods 13, which are connected to the crank 14, the said crank being supported in bearings in a series of cross bearing members 15, which are connected in any usual way to the base at 16. The bearing members 15 are rigidly tied to the supporting-plate 10 by means of the tie members 17, by means of which structure it will be seen that the steam-chest and bearings for the crank-shaft are connected to form a sufficiently rigid structure, so that the engine may be used vertically or horizontally, as circumstances may dictate. By making the cylinders to fit the recesses in the steam-chest with a driving fit and by supporting the free end of the cylinders in the plate 10, as above described, I am enabled to build an engine which is extremely light, and yet which is sufficiently rigid so that it does not shake or jar when in use. Preferably the tie members 17 are made rigid with the cross-bearings 15 in some suitable way and are provided with the collar 18, against which the supporting-plate 10 rests. The tie members pass through the supporting-plate and their extended ends preferably form the tie members 11, the said plate 10 being clamped between suitable nuts 19 on the tie-rod and the shoulders 18. Inasmuch as in this embodiment of my invention there are four cylinders, I will make the cranks on the crank-shaft 14 on the quarter, and the valve 4 is constructed, as hereinafter described, so as to admit steam successively to the various cylinders. By this means a practically constant force is applied to the crank-shaft to turn the same. The cylinders, as above stated, are single-acting, and the valve 4 operates both to admit the steam to the cylinders and to allow it to exhaust therefrom. In this embodiment of my invention the valve is a hollow one and the live steam is admitted to the interior thereof, the steam being admitted to the cylinder through steam-ports in the valve which extend through the same, while the steam is exhausted through recesses on the periphery of the valve, which are adapted to connect the exhaust-ports of the cylinders with a steam or exhaust chamber in the steam-chest. Preferably I employ two admission-ports 21, leading through the steam-chest to each cylinder, and one separate exhaust-port 22 for each cylinder, and the valve is made with a series of steam-ports coöperating with the admission-ports of each cylinder and a similar series of recesses in its periphery coöperating with the exhaust-port of each cylinder, so that during the rotation of the valve steam is admitted to each cylinder a plurality of times. This construction is of advantage where high speed is a desideratum, for the rotary speed of the valve may be comparatively slow compared with that of the crank-shaft, and as there is no oscillating motion of the valve at all, but simply a continuous rotary motion, all reciprocating movements which are a bar to the attainment of high speed are abolished. As stated before, said valve 4 fits a cylindrical bore in the steam-chest and at its end communicates with the steam-inlet pipe 23, which operates to admit steam to the interior of the valve. Coöperating with the inlet-ports 21 for each cylinder are a series of steam-ports 25, extending through the valve, there being four such ports in this embodiment of my invention positioned ninety degrees apart. The angular distance between the ports is the same as that between the admission-ports 21, so that as the valve 4 is rotated steam-ports 25 come opposite both the admission-ports 21 simultaneously, and steam is admitted to the cylinder through both ports. In order that steam may be admitted to the various cylinders successively, the steam-ports in the valve which coöperate with the different cylinders have a different circumferential position on the valve. For instance, the steam-ports 25 coöperating with cylinder $a$ will admit steam during the first quarter of the rotation of the crank-shaft 14, the steam-ports coöperating with cylinder $b$ will admit steam thereto through the second quarter of rotation of said crank-shaft, and steam will be admitted through the proper ports 25 to cylinder $c$ during the third quarter of the rotation and to cylinder $d$ during the last quarter of the rotation. Since the valve 4 rotates at only one-quarter of the speed of the crank-shaft, it will be seen that the steam-ports 25 for the successive cylinders will be spaced circumferentially about twenty-two and one-half degrees apart.

Fig. 12 illustrates the position of the steam-ports corresponding to the position of the piston in cylinder $a$—that is, the steam is being admitted to the cylinder and the piston is moving in the direction of the arrow, Fig. 1.

Fig. 11 illustrates the position of the steam-ports in the valve controlling the admission of steam to cylinder $b$.

Fig. 10 illustrates the steam-ports for cylinder $c$, and Fig. 9 illustrates the steam-ports for cylinder $d$. The direction of rotation of the valve in these figures is indicated by the arrow.

The steam-chest 3 has the steam-spaces 30, which partially surround the valve 4 and which are connected by the passage 31, the said steam-spaces and passage forming an exhaust-chamber which communicates with the exhaust-pipe 32. The valve 4 has formed in its periphery opposite each exhaust-port 22 a series of recesses 37, either side of each exhaust-port the said valve is supported on bearing-surfaces 35 and 36, respectively, the bearing-surface 36 being longer than the recesses 37 and the bearing-surface 35 being shorter than the said recess. With this construction it will be seen that as the valve rotates from the position shown in Fig. 15 to that shown in Fig. 14 the exhaust-port 22 is connected through the recess 37 with the steam-space 30 of the exhaust-chamber, and the steam will consequently be exhausted from the cylinder.

Fig. 16 illustrates the position of the exhaust-recesses in the valve corresponding to the position of the steam-port shown in Fig. 12. These two figures show the position of the inlet and exhaust ports for the position of the piston in the cylinder $a$. When the piston reaches the lower end of its stroke—that is, the position of the piston in cylinder $b$—the valve will be in the position shown in Figs. 11 and 15—that is, the exhaust is just ready to open and the steam-port is closed. As the piston ascends to the position shown in cylinder $c$ the exhaust continues open, as shown in Fig. 14, and the steam-port continues closed, as shown in Fig. 10. When the cylinder approaches the upper end of its stroke, the exhaust-port will close, and the steam remaining in the cylinder will be compressed to cushion the piston, as is customary, and as the piston reaches the extreme upward limit of its stroke the valves are in the position shown in Figs. 9 and 13, the steam-ports in the valve being just ready to admit steam to the inlet-ports 21.

It is necessary that the speed of rotation of the valve have a definite relation to the speed of the engine, and I therefore prefer to rotate my valve by mechanism driven by the crank-shaft of the engine. As illustrated, the end of the crank-shaft 14 has fast thereon the bevel-gear 40, which meshes with the bevel-gear 41, fast on the shaft 42, which is journaled in any suitable way in bearings 43 and 44, respectively. The upper end of the shaft carries the bevel-gear 45, which meshes with the bevel-gear 46 on the stem of the valve 4, and the relation between the gears is such that the valve rotates at one-quarter the speed of the crank-shaft.

To reverse the engine, I provide means whereby the valve may be turned relative to the crank-shaft and in such position that the steam will be admitted to the cylinders in the reverse order from that specified above.

Referring to Fig. 1, it will be seen that the hub 48 of the bevel-gear 45 is elongated and receives within the same the concentric sleeve 49, which is splined to the shaft so as to rotate therewith, but admit of its having longitudinal movement thereon. The sleeve 49 has projecting from opposite sides thereof the pins 50, on which are supported antifriction-rolls 51, engaging spiral grooves 52 in the hub of the bevel-gear 45. Connected to the lower end of the sleeve 49 is the operating-lever 53, which is pivoted in any suitable way to the frame of the engine and has the forked arm 54 engaging a collar 55 in an annular groove in the end of the sleeve 49. By turning the lever 53 the sleeve 49 is moved longitudinally of the shaft 42 and through the spiral groove 52 turns the bevel-gear, and consequently the valve, in relation to the shaft.

The position of the valve with relation to the various cylinders when said valve is in its reversed position is shown in Figs. 17 to 20, inclusive, and it will be seen that the steam is just being admitted to cylinder d, (see Fig. 17,) while the steam-ports leading to the cylinder c are full open, (see Fig. 18,) the steam-ports leading to b and a being closed, Figs. 19 and 20, while the exhaust-port leading to the cylinder a is open. (See Fig. 24.) With this position of the valve relative to the position of the pistons the engine will be reversed, as will be obvious.

It not infrequently happens that the steam becomes condensed in the cylinders, and such water of condensation sometimes accumulates in such quantities as to render it impossible to start up the engine without blowing out the cylinders. To obviate this difficulty and to provide an engine which will readily start up under all conditions, I employ a series of auxiliary exhaust-openings 60 in connection with each exhaust-recess 37, such openings affording a communication between the exhaust-port 22 and the exhaust-chamber 30 after the recess 37 or main exhaust-port has closed the steam-port 22. The position of these auxiliary steam-openings is shown in Fig. 13, the said openings passing from the deepest portion of the recess 37 through the body of the valve to the exterior thereof some distance to the rear of the edge of the recess. Preferably I will use three or more of these auxiliary openings in connection with each recess 37; but the combined area of the said auxiliary openings will be such as not to appreciably affect the volume of steam retained in the cylinder after the main recess 37 has closed the exhaust-port. If, however, water of condensation accumulates in any cylinder and the piston comes to the upper limit of its stroke, such water of condensation will be forced out through the auxiliary opening 60, as will be evident from an inspection of Fig. 13.

In engines which are used for driving motor-vehicles it is of great advantage to have some mechanism for varying the point of cut-off of the valve according to the amount of work being done by the engine.

In my improved valve I have provided in addition to the regular valve for admitting and exhausting steam from the cylinders a supplemental cut-off valve which may be adjusted to vary the point of cut-off of the main valve. In this embodiment of my invention, wherein the steam is taken into the interior of the main valve, I place my cut-off valve on the interior of the main valve, said cut-off valve being shown as a cylindrical valve 70, fitting the interior of the main valve and having, preferably, the two ports 71, which are normally in line with the admission-ports 21 through the steam-chest. The cut-off valve 70 is normally stationary and its stem projects through the hollow stem 73 of the main valve 4. The projecting end of the stem of the cut-off valve has secured thereto the pivoted latch 74, the nose of which is adapted to engage any one of a series of notches in a holder 75, fast to the frame of the engine. When it is desired to take steam for the maximum length of time, the auxiliary or cut-off valve will be set with its ports 71 in alinement with the ports 21 in the steam-chest, as seen in Figs. 5 and 6.

In Fig. 5 the main valve 4, which is rotating in the direction of the arrow, is just beginning to open the port 21 and at the same time has just uncovered the port 71 in the cut-off valve.

Referring to Fig. 6, which shows the main valve 4 in the position just after the point of cut-off, it will be seen that the port 21 is closed just previous to the port 71, so that with the cut-off valve in the position shown in Figs. 5 and 6 steam will be admitted to the cylinder for the same length of time it would be if the cut-off valve were not used. If it is desired to shorten the cut-off, the valve 70 is moved in the direction of the hands of a clock to bring the port 71 into the position, for instance, shown in Figs. 7 and 8. When in this position, it will be observed that the port 71 is brought into registry with the steam-port 25 of the valve just before the port 21 is opened, and on referring to Fig. 8 it will be seen that the valve 4 has closed the port 71, so as to cut off steam from the engine, before the said valve closes the valve 21 in the steam-chest. Since no steam is admitted to the engine after the port 71 is closed, it will be obvious that the point of cut-off of the engine may be made to occur at any position of the stroke of the piston desired.

It will be understood, of course, that the valve 70 runs the full length of the valve 4 and has the port 71 coöperating with the ports 25 for each cylinder.

One important feature of my invention consists in providing in a steam-engine, in connection with a main rotary valve, a cut-off valve, whether manually or automatically operated, which is concentric with the main rotary valve, and as I believe I am the first to use such a structure I would consider as coming within my invention any form of valve mechanism which comprised a rotary main valve and a concentric cut-off valve, whether the concentric cut-off valve were on the interior of the main valve and live steam were admitted to the interior of said cut-off valve, as herein illustrated, or whether the parts were reversed and the steam were exhausted from the interior of the main valve and the live steam and cut-off valve were exterior thereto, or whether the cut-off valve were on the exterior of the main valve, but the live steam admitted to the interior of the latter valve, as herein illustrated.

Various other changes may be made in the structure of the device without departing from the spirit and scope of my invention as expressed in the appended claims.

Having fully described my invention, what I claim as new, and desire to secure by Letters Patent, is—

1. In a steam-engine, a steam-chest having a series of recesses on its exterior, a series of cylinders supported at one end in said recesses, a supporting-plate having a series of apertures into which the other end of said cylinder fits, and tie members connecting said plate and steam-chest, whereby the cylinders are frictionally held between said plate and steam-chest.

2. In a steam-engine, a steam-chest having a series of recesses on its exterior, a series of cylinders supported at one end in said recesses, a supporting-plate having a series of apertures to fit the other end of said cylinders, a bearing member for the crank-shaft, and tie members connecting the supporting-plate to the steam-chest and bearing member respectively.

3. In a valve mechanism for steam-engines, a steam-chest a rotary valve therein and means to rotate the said valve, a plurality of admission-ports leading to the cylinder, a plurality of steam-ports in said valve, said steam-ports being so positioned as to register with the admission-ports simultaneously, whereby steam may be admitted to the cylinder through both admission-ports simultaneously.

4. In a valve mechanism for a steam-engine, a steam-chest, a rotary valve therein, means to rotate said valve, said steam-chest having a plurality of inlet or admission ports leading to the cylinder, and said valve having a plurality of steam-ports, the angular distance between any two adjacent ports in the valve being the same as that between the inlet-ports, whereby steam is admitted to the cylinder a plurality of times during each rotation of the valve and through both inlet-ports simultaneously.

5. In a valve mechanism for a steam-engine, a steam-chest, a rotary valve therein, means to rotate said valve, said steam-chest having a plurality of inlet-ports leading to the cylinder and an exhaust-port leading from the cylinder, said valve having a plurality of steam-ports and a corresponding number of exhaust-ports, the angular distance between any two adjacent steam-ports being such that as the valve rotates said two ports are brought simultaneously into register with the two inlet-ports whereby steam is admitted to and exhausted from the cylinder a plurality of times during each rotation of the valve and is admitted simultaneously through both inlet-ports.

6. In a steam-engine, a series of cylinders, a steam-chest having a plurality of inlet-ports leading to the same end of each cylinder, a rotary valve in said steam-chest, means to rotate the same, said valve having a series of steam-ports coöperating with the inlet-ports of each cylinder, whereby steam is admitted to each cylinder a plurality of times during each rotation of the valve and through all the inlet-ports to any one cylinder simultaneously.

7. In a steam-engine, a series of cylinders, a steam-chest having two inlet-ports leading to the same end of each cylinder, and an exhaust-port leading therefrom, a rotary valve in said steam-chest, means to rotate the same, said valve having a plurality of steam-ports and a plurality of exhaust-ports coöperating with each cylinder, whereby steam is admitted to and exhausted from each cylinder a plurality of times during each rotation of the valve.

8. In a valve mechanism for steam-engines, a steam-chest having an admission-port leading to a cylinder, a hollow rotary reversible main valve in said steam-chest, said valve having a steam-port adapted to periodically register with the admission-port, a hollow cut-off valve fitting the interior of the main valve and having a port therein, means to admit steam to the interior of the cut-off valve, said cut-off valve being adapted to be adjusted about its axis whereby the point of cut off of the main valve may be varied, and means to reverse the main valve.

9. In a valve mechanism for steam-engines, an admission-port leading to the cylinder, a hollow rotary reversible main valve having one or more steam-ports to periodically register with one or more admission-ports, a cut-off valve in the interior of the hollow rotary valve, whereby the point of cut-off of the main valve may be varied, and means to reverse the main valve.

10. In a steam-engine, a cylinder, an admission-port leading to the cylinder and an exhaust-port leading therefrom, a rotary reversible valve controlling said ports, means to rotate the valve and valve-reversing mechanism.

11. In a steam-engine, a plurality of cylinders, an admission-port leading to each cylinder and an exhaust-port leading from each cylinder, a rotary reversible valve controlling all of said ports, and valve-reversing mechanism.

12. In a steam-engine, a cylinder, a piston therein having operative connection with a crank-shaft, a steam-chest having an inlet-port leading to the cylinder and an exhaust-port leading therefrom, a valve in said steam-chest, means to rotate said valve, said valve having a steam-port adapted to periodically register with the inlet-port, and an exhaust-port adapted to periodically register with the exhaust-port leading from the cylinder, and means whereby the valve may be shifted relative to its rotative mechanism, the construction being such that the direction of rotation of the crank-shaft is determined by the position of the valve.

13. In a steam-engine, a plurality of cylinders, pistons therein having operative connections with a crank-shaft, a rotary valve controlling the admission of steam to all of said cylinders and the exhaust therefrom, valve-actuating mechanism, and means whereby the relative position of the valve and the crank-shaft may be changed, the construction of the valve being such that the direction of rotation of the crank-shaft is determined by the relative position of the valve thereto.

14. In a steam-engine, a plurality of cylinders, a steam-chest having two admission-ports leading to the same end of each cylinder and an exhaust-port leading from each cylinder, a hollow rotary main valve in said steam-chest, said valve having a plurality of steam-ports adapted to coöperate with the admission-ports of each cylinder and a corresponding number of exhaust-ports, an adjustable hollow cut-off valve inside of and concentric with the main valve and means to admit steam to the interior of the cut-off valve, the adjustment of the cut-off valve varying the point of cut-off of the main valve.

15. In a steam-engine, a series of cylinders, a steam-chest having a cylindrical bore, a hollow rotary valve fitting said bore, a plurality of connected steam-spaces partially surrounding said valve, and constituting an exhaust-chamber, admission and exhaust ports leading to and from each cylinder, said valve having a series of steam-ports coöperating with the admission-ports of each cylinder and adapted to periodically connect said admission-ports with the interior of the valve, and a series of recesses in its periphery coöperating with each exhaust-port, said recesses operating to periodically connect each exhaust-port with the steam-spaces, and means to admit steam to the interior of the valve, whereby steam is admitted and exhausted from each cylinder a plurality of times during each rotation of the valve.

16. In a steam-engine, a series of cylinders, a steam-chest having a cylindrical bore, and a steam-chamber, each cylinder having an exhaust-port and two admission-ports, a rotary hollow reversible valve fitting said cylindrical bore, said valve having a plurality of steam-ports adapted to coöperate with the admission-ports of each cylinder, and opening into the interior of the valve, and a plurality of recesses on its periphery coöperating with each exhaust-port, said recesses operating to periodically connect each exhaust-port with the steam-chamber, whereby steam is admitted to and exhausted from each cylinder a plurality of times during each rotation of the valve.

17. In a steam-engine, one or more cylinders, a steam-chest having a cylindrical bore and a steam-chamber, two admission-ports leading to each cylinder, and an exhaust-port leading from each cylinder, a hollow rotary main valve fitting said cylindrical bore, and having a plurality of steam-ports coöperating with the admission-ports of each cylinder, and a plurality of recesses in its periphery coöperating with each exhaust-port, a hollow cut-off valve concentric with and on the interior of the main valve, said cut-off valve having two ports adapted to coöperate with the admission-ports, and means to adjust the cut-off valve angularly, whereby the point of cut-off of the main valve may be varied.

18. In a valve mechanism for steam-engines, a valve having a steam-port, and main and auxiliary exhaust-ports, and means to operate the valve, whereby the auxiliary exhaust-port closes subsequent to the main exhaust-port.

19. In a valve mechanism for steam-engines, a rotary valve having a steam-port, a main exhaust-port and an auxiliary exhaust-port of reduced area, and means to rotate the valve, the auxiliary exhaust-port being so positioned as to close subsequently to the main exhaust-port.

20. In a valve mechanism for steam-engines, a rotary hollow valve, having a steam-port opening into its interior, and adapted to periodically register with the inlet or admission port to the cylinder, means to admit steam to the interior of the valve, said valve having a recess on its exterior adapted to coöperate with the exhaust-port of the cylinder, and auxiliary exhaust-openings connecting said recess with the exterior of the valve, said openings allowing any water of condensation to escape after the exhaust-port is closed.

21. In a steam-engine, a steam-chest having admission and exhaust-ports leading to and from the cylinder, a rotary hollow valve in said steam-chest, means to admit steam to the interior of said valve, a steam-port extending through said valve, and adapted to periodically register with the admission-port, an exhaust-chamber in said steam-chest, a recess in the periphery of the valve and adapted to connect the exhaust-port with the exhaust-chamber, and an auxiliary exhaust-opening at the rear of the recess, and connecting the same with the exterior of the valve, whereby the communication between the exhaust-port and exhaust-chamber is open through the auxiliary openings after it is closed through the recess.

22. In a steam-engine, a plurality of cylinders, a steam-chest having a cylindrical bore, a hollow rotary valve fitting said bore, an exhaust-chamber partially surrounding said valve, admission and exhaust ports leading to and from each cylinder, said valve having a series of steam-ports coöperating with the admission-port of each cylinder, and a series of recesses in its periphery coöperating with each exhaust-port, said recesses each having auxiliary exhaust-openings extending to the exterior of the valve and means to admit steam to the interior of said valve.

In testimony whereof I have signed my name to this specification in the presence of two subscribing witnesses.

CHARLES CROMPTON.

Witnesses:
GEORGE H. KIMBALL,
HERMAN F. KLINGELE.